United States Patent [19]

Van Laethem et al.

[11] 4,414,015
[45] Nov. 8, 1983

[54] PROCESS AND APPARATUS FOR FORMING A METAL OR METAL COMPOUND COATING

[75] Inventors: Robert Van Laethem, Loverval; Robert Terneu, Charleroi, both of Belgium

[73] Assignee: BFG Glassgroup, Paris, France

[21] Appl. No.: 275,048

[22] Filed: Jun. 18, 1981

[30] Foreign Application Priority Data

Jun. 20, 1980 [GB] United Kingdom ............... 8020166

[51] Int. Cl.$^3$ ............................................ C03B 29/04
[52] U.S. Cl. ..................................... 65/60.3; 65/60.4; 65/60.5; 65/118; 65/161; 65/203; 65/350
[58] Field of Search ................. 65/118, 119, 161, 350, 65/95, 194, 203, 60 (U.S. only), 60.3, 60.4, 60.52

[56] References Cited

U.S. PATENT DOCUMENTS

| | | | |
|---|---|---|---|
| 3,508,899 | 4/1970 | Ward | 65/119 |
| 3,679,386 | 7/1972 | Kushihashi et al. | 65/194 X |
| 3,887,349 | 6/1975 | Akashi et al. | 65/161 |
| 3,914,118 | 10/1975 | Brooke et al. | 65/118 |
| 4,022,601 | 5/1977 | Sopko | 65/99.2 |
| 4,188,199 | 2/1980 | Laethem et al. | 65/182.1 |
| 4,303,437 | 12/1981 | Garcelon | 65/118 |

Primary Examiner—Arthur D. Kellogg
Attorney, Agent, or Firm—Spencer, Kaye & Frank

[57] ABSTRACT

In order to control the thickness of a metal or metal compound coating which is formed on a face of a freshly formed ribbon of hot glass during its travel from a flat glass forming installation by contacting such face at a coating station with a fluid medium or fluid media comprising a substance or substances from which the coating is formed, preparatory to being coated, the glass (4) is thermally conditioned (e.g. selectively or differentially heated) at a thermal conditioning station between the flat glass forming installation and the coating station, so as to eliminate or reduce temperature gradients across the ribbon width to be coated.

Apparatus suitable for use in the method comprises means (7-10) for delivering (a) fluid coating medium or media into contact with the glass (4) at the coating station, and means such as heating means (14-16) whereby the temperature of one or more portions of the ribbon width can be conditioned selectively or differentially at a thermal conditioning station located between the flat glass forming installation and the coating station.

24 Claims, 2 Drawing Figures

PROCESS AND APPARATUS FOR FORMING A METAL OR METAL COMPOUND COATING

BACKGROUND OF THE INVENTION

This invention relates to a process for forming a metal or metal compound coating on a face of a freshly formed ribbon of hot glass during its travel from a flat glass forming installation, by contacting such face at a coating station with a fluid medium or fluid media comprising a substance or substances from which said coating metal or metal compound is formed on said face.

Processes of the foregoing kind are used for example for forming surface coatings which modify the apparent colour of the glass and/or which confer some other required property in respect of incident radiation, e.g. an infra-red-reflecting property.

In some such processes, the substance(s) from which the required coating is formed is or are supplied in the liquid phase, e.g. by spraying. In other cases the said substance(s) is or are supplied in the vapour phase.

Processes as referred to are particularly useful for forming good quality metal oxide coatings on ribbons of glass during their conveyance from the flat glass forming installation, e.g. a drawing machine or a float tank. The metal oxide coating can be formed by spraying the glass ribbon with a solution of a metal compound from which the metal oxide is formed in situ by chemical reaction or decomposition, e.g. by pyrolysis, on contact with the hot ribbon. A specific example is the formation of a tin oxide coating by spraying a solution of a tin chloride, with or without other ingredients. Alternatively a said metal oxide coating can be formed by contacting the hot ribbon with a stream of a vaporised metal compound e.g. a vaporised tin compound, and a stream of oxygen or oxygen-containing gas to cause an oxidation reaction with formation of the required metal oxide coating on the ribbon. Processes as referred to can however also be used for forming coatings of other metal compounds, e.g. for forming a coating of a metallic boride, sulphide, nitride, carbide or arsenide by reacting a corresponding metallic or organometallic compound with a halogenated boron compound, $H_2S$, $NH_3$, $CH_4$, or an arsenic containing compound, in the absence of oxygen. Metal coatings can be formed by contacting the glass ribbon in a reducing atmosphere or at least in the absence of oxygen, with a metal carbonyl, e.g. nickel carbonyl, which decomposes under the action of heat provided by the hot ribbon.

It is not easy to form coatings satisfying the high quality standards which the market sometimes demands. One important problem which is encountered is that of controlling the thickness of the coating so that it complies with given standards. The thickness of the coating forming on any region within the area of the glass ribbon is susceptible of the influence of various factors. These include not only the rate at which the fluid coating medium or media is or are supplied to the coating station but also the temperature conditions at that station. The temperature conditions of the glass at the coating station are of course determined primarily by the temperature to which the glass is heated in the flat glass forming installation, which in turn depends on the nature of that installation and the required specifications of the ribbon.

The temperature of the glass at the coating station is liable to vary in course of time and from one part of the ribbon to another. Such temperature differences may occur for example because of a change being effected in the thickness and/or speed of the glass ribbon, or because of the influence of convection currents circulating above and around the glass ribbon. Differences in glass ribbon temperature in course of time or across the ribbon can to some extent be compensated for by modifying the temperature at which the fluid coating medium or media is or are fed to the coating station, but it is not always convenient and in some cases it is not possible for the coating thickness to be influenced quickly enough or to the required extent in that way.

SUMMARY OF THE INVENTION

It is an object of the present invention to provide a coating process wherein the temperature of the glass ribbon is influenced in a convenient manner and in a way which assists formation of a coating of the required thickness.

According to the present invention there is provided a process for forming a metal or metal compound coating on a face of a freshly formed ribbon of hot glass during its travel from a flat glass forming installation, by contacting such face at a coating station with a fluid medium or fluid media comprising a substance or substances from which said coating metal or metal compound is formed on said face, characterised in that preparatory to being coated the glass is thermally conditioned at a thermal conditioning station between the flat glass forming installation and the coating station, so as to eliminate or reduce temperature gradients across the ribbon width to be coated.

The "ribbon width to be coated" can be the full width of the ribbon or a lesser width, e.g. a central portion of the ribbon width between two marginal strips which are left uncoated.

The reduction or elimination of temperature gradients across the glass ribbon at the thermal conditioning station has the indirect effect of reducing or avoiding variations in the coating thickness transversely of the ribbon.

The temperature of the glass ribbon usually varies across the ribbon width. The side marginal regions of the ribbon tend to cool more quickly than the medial part of its width, with the consequence that the thickness of the coating formed at the coating station tends to increase or decrease from the side margins of the ribbon towards its longitudinal centre line, depending on the type of coating compositions employed.

Accordingly, in some embodiments of the invention, the thermal conditioning to which the ribbon is subjected is such as to cool the medial part of its width to or towards the temperature of the side marginal regions of the width to the coated. Alternatively, heat radiating from such medial part may be reflected back to the side regions to reduce the heat loss at those side regions.

It is however preferred that said conditioning station be constituted as a heating station which is controlled so that one or more portions of the ribbon width is or are selectively or differentially heated. This has the advantage of allowing greater latitude in the choice of location for the coating and thermal conditioning stations in particulat so that if a high ribbon temperature is required for the coating operation in view, those stations need not be located inconveniently close to the ribbon forming installation itself.

When carrying out the invention, the heat supply distribution at the heating station can be such that each portion of the ribbon width to be coated has on arrival at the coating station a temperature condition which is appropriate for the formation of a coating of the required thickness under the conditions prevailing at that coating station. The heating affords a convenient control facility whereby the thickness of the coating formed on the glass ribbon can be controlled, if required over the whole transverse extent of the coating. The temperature control is exercisable without affecting the conditions under which the glass ribbon is formed. The process according to the invention can e.g. be performed in float glass production plant and in sheet glass production plant using a glass drawing machine of the Libbey-Owens type.

In certain processes according to the invention, the heat is supplied at the heating station so as only to heat marginal portions of the ribbon width to be coated. In consequence the glass is brought to a uniform or more uniform temperature across the width of the ribbon preparatory to coating and substantially without affecting the coating thickness in the central portion of the ribbon width.

In other processes according to the invention, heat is supplied at the heating station so that the whole of the ribbon width to be coated is heated but to an extent which varies transversely of the ribbon. In such processes the heating both avoids or reduces coating thickness variations transversely of the ribbon, and alters the mean thickness of the coating.

Advantageously, heat is supplied to the glass at the heating station wholly or mainly from one or more radiant heaters. For example the glass may be heated at the heating station by radiant heaters having a black body temperature in excess of 1000° C. Preferably one or more gas-fired radiant heaters is or are employed. However, radiant heaters of electrical resistance type can be used. Alternatively use can be made of combustible fuel burners. Heat reflectors can be provided for directing the radiant heat towards the glass ribbon.

In certain embodiments of the invention heat is supplied to the glass at the heating station wholly or mainly by feeding pre-heated gas from an extraneous source into the environment above the ribbon. That mode of heating affords the advantage that it avoids the need to provide and service heaters in the vicinity of the glass ribbon path. The pre-heated gas can be discharged into the environment over the ribbon from different orifices or from different series of orifices located respectively over the different portions of the ribbon to be heated.

A combination of different kinds of heating may be employed for heating the glass ribbon at the heating station. For example radiant heaters can be used in conjunction with the supply of pre-heated gas into the environment above the ribbon.

Preferably, a transverse screening wall is provided above the ribbon path, between the coating and thermal conditioning stations. Such a screening wall, serving as a kind of downstream boundary to the thermal conditioning station (the downstream direction being the direction of travel of the glass ribbon), facilitates attainment of a predetermined selective or differential thermal conditioning of the glass ribbon at the thermal conditioning station.

It is convenient for the coating station to be located in a tunnel along which the glass ribbon travels from the flat glass forming installation. Such tunnel may for example be the annealing lehr conventionally employed in many flat-glass forming plants. Said transverse screening wall as above referred to can conveniently extend transversely across the upper part of the tunnel, between its side walls. It is most convenient if both the coating station and the thermal conditioning station are located in a said tunnel.

The invention includes processes in which the glass ribbon is heated at the thermal conditioning station by heat supplied from within a compartment located above the path of the ribbon, to the interior of which compartment the glass ribbon is exposed, such compartment having upstream and downstream boundary walls whose lower edges are spaced from the ribbon. A said compartment (hereafter called "temperature control compartment") can be formed quite easily by providing transverse screens within a tunnel as above referred to, so as to serve as the upstream and downstream boundary walls of the compartment. The provision of both downstream and upstream boundary walls to the thermal conditioning station further facilitates heating portions of the glass ribbon in a required selective or differential manner preparatory to passage of the glass through the coating station. One or more partition walls can be provided for partitioning the temperature control compartment into side by side sections for further promoting selective or differential thermal conditioning of portions of the ribbon width.

In certain embodiments of the invention, the heating of the glass at the thermal conditioning station is achieved wholly or mainly by feeding pre-heated gas from an extraneous source into a temperature control compartment as above referred to.

The supply of hot gas into a temperature control compartment as above described can afford important secondary advantages if the ribbon is coated in a tunnel which is in closed communication with the flat glass forming apparatus, as it is for example in a conventional Libbey-Owens type flat glass forming plant. During investigation of the causes of irregularities and defects which sometimes occur in coatings formed in the tunnel, it has been found that the natural draught currents within the tunnel can be a contributory cause of such defects. Currents of hot gas from the glass forming installation travel forwardly along the tunnel above the glass ribbon and a return cooler gas current flows back beneath the ribbon, towards the forming installation. Such natural draught currents are subject to unpredictable variations of various magnitudes, depending on the plant design. It is not possible to prevent flow of gases along the tunnel, through the coating station, without creating a very adverse pattern of gas currents and temperature gradients within the tunnel as a consequence of the partial vacuum effect.

In certain processes according to the present invention the glass ribbon is heated prior to being coated, by the action of hot gas fed into a temperature control compartment as above specified, and the feed rate of the hot gas into said compartment is sufficient to maintain a continuous upstream and downstream flow of gas from said compartment via the slots between the glass ribbon and the upstream and downstream boundary walls of the compartment.

The maintenance of escape flows of hot gas from a temperature control compartment as above specified is beneficial for achieving the best temperature control effects. Moreover if the coating process is performed in the annealing tunnel of a flat glass drawing plant the escape current of gas in the upstream direction constitutes a barrier to the natural draught currents from the sheet glass drawing machine and prevents the environment in the coating station being affected by the direct action of such natural draught currents. The normal flow of environmental gas to the coating station from the drawing machine is replaced by a flow of hot gas from the temperature control compartment. The interception of the said natural draught currents affords the further advantage of avoiding or reducing the deposition of dust on the glass ribbon during its travel further downstream along the tunnel.

In certain embodiments of the invention the hot gas is fed into a said temperature control compartment in a direction which is inclined downwardly towards the upstream gas escape slot. Provided that the upstream gas escape slot is not too wide, this directional deliverly of gas into the compartment affords the advantage that, other things being equal, a lower volume rate of feed of hot gas into the compartment will suffice for maintaining a required exit flow of gas from the compartment.

The height of the escape slots between the upstream and downstream boundary walls of the temperature control compartment and the ribbon influences the rate at which hot gas must be fed into the compartment in order to maintain an upstream escape flow of the hot gas.

Preferably the height of the upstream gas escape slot, (i.e. the distance between the glass ribbon and the bottom edge of the upstream boundary wall of the temperature control compartment) is less than 40 mm. Extensive tests have shown that there are very important benefits to be gained by keeping the width of the upstream escape slot below 40 mm. One very important advantage is that of keeping the consumption of preheated gas for feeding the temperature control compartment within limits which are in ordinary circumstances economically acceptable. In the most important embodiments of the invention, the height of the upstream gas escape slot is less than 20 mm.

The height of the downstream gas escape slot is also a factor influencing the minimum volume rate at which hot gas must be fed into the temperature control compartment in order to maintain an escape flow of the gas in the upstream direction, towards a drawing machine. Preferably the downstream escape slot is also less than 40 mm in height. Processes which have been found to have the highest efficiency, assessed in terms of the effectiveness of a given hot gas consumption for countering disruptive currents in the coating station, are those wherein each of the upstream and downstream escape slots is less than 20 mm in height.

When coating the glass at a coating station located in a tunnel along which the glass ribbon travels away from the flat glass forming installation it is advantageous to provide at least one transverse screen in the tunnel beneath the path of the glass ribbon and near the entrance to the tunnel. Such a bottom screen can restrict the magnitude of relatively cool return gas currents flowing upstream, beneath the glass ribbon, towards the glass forming installation and consequently can further reduce the risk of dust deposition on the glass ribbon. It has been found that the volume rate at which hot gas must be fed into a temperature control compartment in order to counter disruptive convection currents in the coating station is less if such a bottom screen is provided. Preferably a said bottom screen is provided at a position beneath a temperature control compartment above referred to. The said disruptive convection currents can be even more easily countered if two such bottom screens are provided at positions spaced along the path of the return gas currents, near the entrance to the tunnel. Generally it is very satisfactory for the two bottom screens to be located at regions beneath the upstream and downstream boundary walls of a said temperature control compartment.

The invention includes processes wherein the conditioning of the glass ribbon at the thermal conditioning station is automatically controlled in dependence on signals emitted by a device which detects thickness values of the coating on the glass ribbon at a detecting station located downstream from the coating station. For example the coating thickness is assessed by determining the laser beam reflecting property of the coating. Alternative available methods of determining coating thickness are for example those which measure the retrodiffusion of $\beta$-rays or which measure the reflection or transmission of light rays by means of a spectrophotometer, and methods using an X-ray fluorescing detector based on interferometry or scanning microscope techniques.

The coating can be formed from a coating precursor compound which is sprayed in solution onto the glass ribbon. The droplets of solution can be discharged in a stream or streams whose impingement zone or combined impingement zones on the ribbon cover(s) the entire width of the substrate area to be coated. In that case the source or sources of the droplet stream(s) can be stationary. Alternatively one or more streams of droplets can be discharged from one or more spraying devices which is or are repeatedly displaced to and fro transversely of the glass ribbon path so that the stream(s) travel over the full width of the substrate area to be coated.

In certain very advantageous embodiments of the invention the coating is formed from a coating precursor compound which is sprayed in solution onto the glass ribbon, the spray droplets forming at least one stream which is inclined downwardly towards the ribbon in the direction of its movement or in the reverse direction. This procedure promotes steady conditions at the impingement zone(s) of the droplet stream(s) on the glass ribbon.

The invention includes such a coating process wherein at least one jet of pre-heated gas is discharged, in the same direction, from an orifice or orifices and such gas jet(s) influences the temperature of spray droplets on their way to the glass ribbon. The use of one or more pre-heated gas jets in that way also has the effect of further influencing the coating thickness. Consequently this thickness can be adjusted more quickly and over a wider range if such (a) jet(s) is or are used in combination with heating of the glass ribbon at the heating station in accordance with the present invention.

A coating process wherein use is made of one or more droplet streams which is or are downwardly inclined in that way and wherein one or more jets of pre-heated gas is or are used for influencing the temperature of the droplets on their way to the substrate being coated is described and claimed in our British Patent Application No. 8003357 filed on Jan. 31, 1980, and in our U.S. patent application Ser. No. 228,235 filed on Jan. 26, 1981 which claims priority therefrom.

When spraying a liquid medium, the spray is preferably downwardly inclined, in the direction of travel of the glass ribbon or in the opposite direction, so that the included angle between the axis of the droplet stream and the glass ribbon is in the range 20° to 60° and most preferably in the range 25° to 35°. This feature facilitates the formation of coatings of good optical quality. For obtaining the best results all parts of the spray should be incident upon the ribbon at a substantial inclination to the vertical. Accordingly, in the most preferred embodiments of the invention the spray comprises a parallel stream of droplets or one which diverges from its source at an angle of not more than 30°, e.g. an angle of about 20°.

Experiments indicate that uniform coatings can be more easily formed if certain conditions are observed with respect to the distance between the glass ribbon and the source of the spray. Preferably such distance, measured normally to the ribbon, is from 15 to 35 cm. This has been found to be the most suitable range, particularly when observing the preferred inclination and divergency ranges for the spray above referred to.

When using a spray coating technique, it is preferable to perform the coating process while suction forces are created in exhaust ducting whose entrance is located downstream from the droplet stream(s) by which suction forces gases environmental to said stream(s) are caused continuously to flow in the downstream direction away from said stream(s) and directly into said ducting. Such suction forces are of course controlled so that they do not disrupt the spray or render it unsteady. Such processes combine performance of the present invention and the invention which is the subject of U.K. Pat. No. 1 523 991.

The exhaust ducting may comprise at least one exhaust duct having an entrance which extends transversely across the path of the glass ribbon over the width (i.e. the transverse dimension) of the ribbon area being coated. Such entrance may be in the form of a single slot or may comprise a series of inlet orifices distributed across the path of the glass ribbon.

Advantageously the exhaust ducting comprises at least one said exhaust duct which forms or is associated with a mechanical barrier located so as to prevent gases from passing over said duct, towards and into contact with the exhaust gas currents flowing towards the exhaust ducting from the action zone of the droplet stream(s). This particular feature characterises a coating process described and claimed in our British Patent Application No. 8003358 filed Jan. 31, 1980 and in our U.S. patent application Ser. No. 228,234 filed Jan. 26, 1981 which claims priority therefrom.

In the most preferred embodiments of the invention there is a said exhaust duct at each of two or more positions spaced one behind the other in the direction of displacement of the glass ribbon and a said mechanical barrier is formed or is associated with at least the last one of those ducts reckoning in the downstream direction.

A process according to the invention can be applied for forming various oxide coatings by employing a liquid composition containing a metal salt. Very advantageous processes according to the invention include processes wherein the sprayed material is a solution of a metal chloride from which a metal oxide coating forms on the glass ribbon. In some such processes the said solution is a tin chloride solution, e.g. an aqueous or non-aqueous medium containing stannic chloride and a doping agent, e.g. a substance providing ions of antimony, arsenic or fluorine. The metal salt can be employed together with a reducing agent, e.g. phenyl hydrazine, formaldehyde, alcohols and noncarbonaceous reducing agents such as hydroxylamine, and hydrogen. Other tin salts may be used in place of or in addition to stannic chloride, e.g., tin dibutyl diacetate, stannous oxalate, stannous bromide, and nitrates. Examples of other metal oxide coatings which can be formed in a similar manner include oxides of cadmium, magnesium and tungsten. For forming such coatings the coating composition can likewise be prepared by forming an aqueous or organic solution of a compound of the metal and a reducing agent. As a further example the invention can be employed for forming coatings by pyrolysis of organo-metallic compounds, e.g. a metal acetylacetonate, supplied in droplet form to the substrate face to be coated. It is within the scope of the invention to apply a composition containing salts of different metals so as to form a metal coating containing a mixture of oxides of different metals.

A process according to the invention can also be applied for forming coatings by contacting the heated glass ribbon with a gaseous medium. The gaseous medium may comprise one or more substances in gaseous phase which undergo(es) chemical reaction or decomposition to form the required metal or metal compound coating on the glass. Metal oxide coatings can for example be formed by contacting the hot glass ribbon with a stream of oxygen or oxygen-containing gas and a separate stream of a vaporised metal compound with which oxygen reacts to form a metal oxide coating. Various metal oxide coatings can be formed in that matter. For example a tin oxide coating can be formed from a vaporised tin compound and a stream of oxygen-containing gas, and a titanium dioxide coating can be formed using streams of titanium tetrachloride and oxygen. The vaporised metal compound will usually be diluted with an inert gas e.g. nitrogen and the vapour stream may contain additional ingredients for modifying the properties of the coating. Coatings of other metal compounds can likewise be formed from the vapour phase, e.g. a coating of metallic boride, sulphide, nitride, carbide or arsenide by reacting a corresponding metallic or organometallic compound with a halogenated boron compound or with $H_2S$, $NH_3$, $CH_4$ or an arsenic containing compound, in the absence of oxygen. Also metal coatings can be formed. For example, a coating of nickel can be formed by decomposing nickel carbonyl under the action of heat provided by the heated glass ribbon, in a reducing atmosphere or at least in the absence of oxygen.

When forming a coating from the gaseous phase, it is advantageous to cause the gaseous medium to flow along the glass ribbon as a substantially turbulence-free layer as described and claimed in United Kingdom Pat. No. 1 524 326.

The invention includes apparatus suitable for use in coating a freshly formed ribbon of hot glass during its travel from a flat glass forming installation, said apparatus comprising means for delivering (a) fluid coating medium or media into contact with the glass at a coating station, characterised in that there is means whereby the temperature of one or more portions of the ribbon width can be conditioned selectively or differentially at a thermal conditioning station located between the flat glass forming installation and said coating station, so as to eliminate or reduce temperature gradients across the ribbon width to be coated.

The advantage of this apparatus and of the specific optional features hereafter referred to will be apparent from what is written earlier in this specification concerning the coating process and the preferred embodiments thereof.

Said thermal conditioning station is preferably constituted as a heating station incorporating heating means.

In some embodiments of the invention, the heating means is arranged for heating only opposed marginal portions of the ribbon width to be coated.

In other embodiments, the heating means is arranged for heating the whole of the ribbon width to be coated, but to an extent which varies transversely of the ribbon.

Preferably the apparatus comprises regulating means whereby the heat supply distribution across the glass ribbon path at the heating station can be varied.

In certain apparatus according to the invention said heating means comprises one or more radiant heaters. Such radiant heaters are suitably of gas-fired type, but electrical resistance radiators can be used. The radiator or radiators may be associated with one or more heat reflectors for directing heat downwardly towards the glass ribbon.

The invention includes apparatus as above defined wherein the heating means is constructed for heating the glass wholly or mainly by feeding pre-heated gas from an extraneous source into the environment above the glass ribbon at the heating station. Advantageously said means comprises ducting having gas discharge orifices over at least certain portions of the ribbon path through the heating station. In preferred embodiments the heating means is arranged so that streams of gas at different temperatures can be supplied to different discharge orifices.

In certain apparatus according to the invention there is a transverse screening wall above the glass ribbon path, between the thermal conditioning and coating stations.

Preferably the coating station is located within a tunnel along which the ribbon travels from the flat glass forming installation. And most preferably both the thermal conditioning and the coating station are located in such tunnel. One or more screens may be provided beneath the path of the glass ribbon through the tunnel, near the tunnel entrance, in order to reduce the magnitude of return convection currents along the tunnel.

The invention includes apparatus as above defined wherein the heating means is arranged to supply heat to the glass ribbon from within a compartment (herein called "temperature control compartment") which is located above the glass ribbon path and the interior of which is exposed to such path, such compartment having upstream and downstream boundary walls whose lower edges are spaced from such ribbon path.

Preferably there is or are one or more partition walls within said temperature control compartment whereby the compartment is divided into side by side sections, such partition wall(s) serving to concentrate the action of the heating means on particular portions of the ribbon width to be coated.

In certain apparatus according to the invention, the heating means comprises gas discharge ducting arranged for discharging pre-heated gas into a said temperature control compartment from an extraneous source. Advantageously said gas discharge ducting is arranged for discharging pre-heated gas into said temperature control compartment in a direction which is inclined downwardly towards the slot between the upstream boundary wall of such compartment and the path of the glass ribbon.

Preferably the lower edge of each of the upstream and downstream boundary walls of the temperature control compartment is at a distance of less than 40 mm from the path of the glass ribbon.

The apparatus preferably incorporates means for determining the thickness of the coating on the moving glass ribbon and for emitting signals which automatically control the supply of heat to the glass at the heating station. The detecting means may for example assess the thickness of the coating by determining its laser beam reflecting property.

A coating apparatus according to the invention can be used for coating a continuous ribbon of float glass or drawn glass.

The means for delivering fluid medium into contact with the glass at the coating station may comprise one or more spraying devices. Such device(s) may be driven so as repeatedly to traverse the glass ribbon path in to and fro motion. Preferably the spraying device(s) is or are arranged for spraying material at a downward inclination towards the ribbon path, in the direction in which the ribbon is conveyed through the lehr or in the opposite direction.

The means for delivering fluid medium into contact with the glass at the coating station may alternatively comprise means for delivering a said medium in the gaseous phase.

BRIEF DESCRIPTION OF THE DRAWING

Reference will now be made to the accompanying diagrammatic drawings which illustrate certain apparatus according to the invention, selected merely by way of example. The drawings comprise FIGS. 1 and 2 each of which shows in sectional elevation part of a flat glass forming plant incorporating a coating apparatus according to the invention.

DESCRIPTION OF THE PREFERRED EMBODIMENTS

Figure 1:
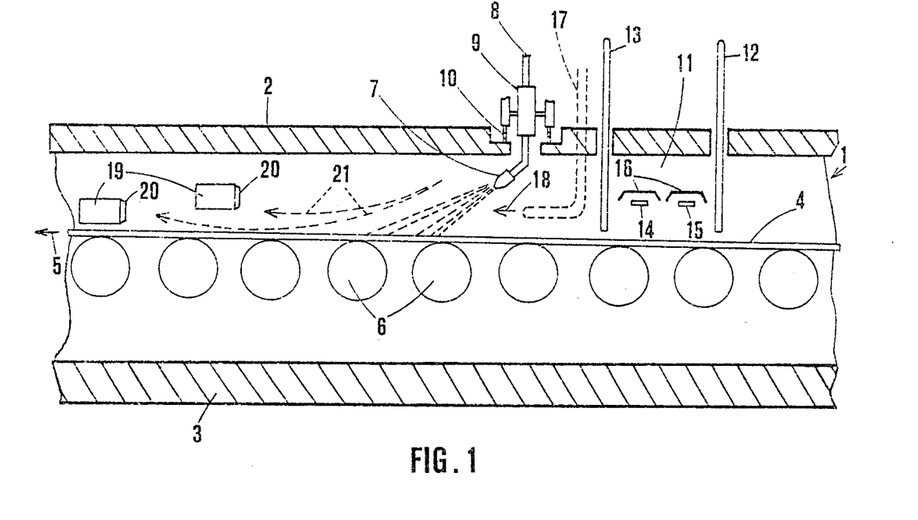

FIG. 1 shows part of a tunnel 1, which is in this instance an annealing lehr, having refractory roof and sole walls 2, 3 along which a ribbon 4 of float glass travels from a float tank (not shown) in the direction of arrow 5. The glass ribbon is supported in the lehr by supporting rollers 6.

At a coating station with the lehr a spray gun 7 is reciprocated to and fro transversely across the ribbon path. The spray gun is fed with coating solution and compressed air via conduits such as 8 supported within a carriage 9 which travels along a track formed by rails 10 mounted on the roof wall of the lehr. The carriage, with the spray gun, is reciprocated by a mechanism (not shown) over a distance and at a speed such that a continuous coating is formed on the full width of the glass ribbon as it travels through the lehr.

Upstream from the coating station there is a temperature control compartment 11. The compartment is formed within the lehr by providing spaced refractory screens 12, 13 which extend transversely across the lehr above the path of the glass ribbon. These screens form the upstream and downstream boundary walls of the compartment. Their lower edges are spaced from the ribbon path. Within the compartment there are radiant heaters such as 14, 15 of gas-fired type arranged in two rows extending transversely across the ribbon path. Radiant heat reflectors 16 are associated with the heaters for reflecting radiant energy downwardly onto the glass ribbon. Control means is provided whereby the fuel supply to different heaters in each row can be independently varied so that the glass ribbon can be heated to an extent which varies across its width. This fuel control means operates in dependence on signals from a coating thickness detector which senses the laser beam reflecting property of the coating at various positions across the ribbon at a detecting station located further downstream.

The temperature of the ribbon as it enters the annealing lehr is lower near the side edges of the ribbon than at its centre. In these circumstances the fuel supply to the rows of heaters 14, 15 is controlled so that heat is radiated only or mainly towards the marginal portions of the glass ribbon. The disparity in temperature between the marginal zones and the central zone of the ribbon can thereby be eliminated or appreciably reduced.

The apparatus can be modified, within the scope of the invention, by providing heaters only over opposed marginal portions of the path of the glass ribbon, and/or by using electrical resistance instead of gas-fired heaters.

In some plant, the difference in temperature between the margins and central portion of the glass ribbon may be large, e.g. from 20° to 30° C. If the heating of the ribbon where it passes beneath the temperature control compartment 11 does not sufficiently reduce the temperature gradients across the ribbon, residual temperature gradients can be wholly or partly compensated for by modifying the temperature of the coating solution spray to an extent which varies during each traverse of the spray across the path of the ribbon. For this purpose ducting 17 as indicated in broken line can be provided which has discharge orifices distributed across the lehr behind the path of reciprocation of the spray and jets of pre-heated gas can be discharged from those orifices towards the spray as suggested by arrow 18. The gas jets affect the temperature of the droplets encountered by the jets, and consequently the thickness of the coating which forms on the glass ribbon from such droplets. In order to compensate for the residual temperature gradients across the ribbon as above referred to, the gas jets discharged from ducting 17 should generally act on the spray droplets only or primarily during movement of the spray across the central portion of the ribbon width or across the marginal portions thereof.

The temperature of the gas jets may for example be such as to promote evaporation of solvent from or mainly from the droplets travelling towards the marginal portions of the ribbon in order to promote formation of a thicker coating on such ribbon portions. But it is to be noted that in some cases, depending on the nature of the coating precursor material, heating of droplets may reduce rather than increase the coating thickness.

By acting on droplets of coating material by gas jets of controlled temperature, it is also possible to compensate or partly compensate for the decelerations of the spraying device which normally occur towards the ends of its traverse across the tunnel in the event that the spraying device is driven in and fro motion.

The action of jets of pre-heated gas on droplets of a sprayed coating solution as above referred to is described and claimed in U.S. patent application Ser. No. 228,235 filed Jan. 26, 1981. The same jets, or additional gas jets, can be directed so as to contribute to some extent to an improvement in the quality of the coating by intercepting or diluting reaction products which may contaminate the environment behind the spray and be entrained downwardly into contact with the glass immediately before it is coated. Such action is described and claimed in British patent application No. 8003359 filed Jan. 31, 1980, and in U.S. patent application Ser. No. 228,233 filed Jan. 26, 1981 which claims priority therefrom.

The gas jets from ducting 17, like the heaters 14, 15 in the compartment 11, can be controlled automatically in dependence on signals emitted by a coating thickness detector.

Downstream from the coating station there are exhaust ducts 19 which extend across the lehr and are connected to means (not shown) for maintaining suction forces in those ducts. The object of this exhaust system is to cause gases in the environment of the spray to be aspirated downstream away from the path of reciprocation of the spray and into the entry nozzles 20 of the exhaust ducts, as suggested by the broken lines 21, and thereby reduce the risk of spurious surface deposits on the formed coating. The suction forces are adjusted so that the trajectories of the droplets from the spray gun are substantially unaffected and the process is therefore in accordance with the invention described in United Kingdom patent No. 1 523 991.

Figure 2:
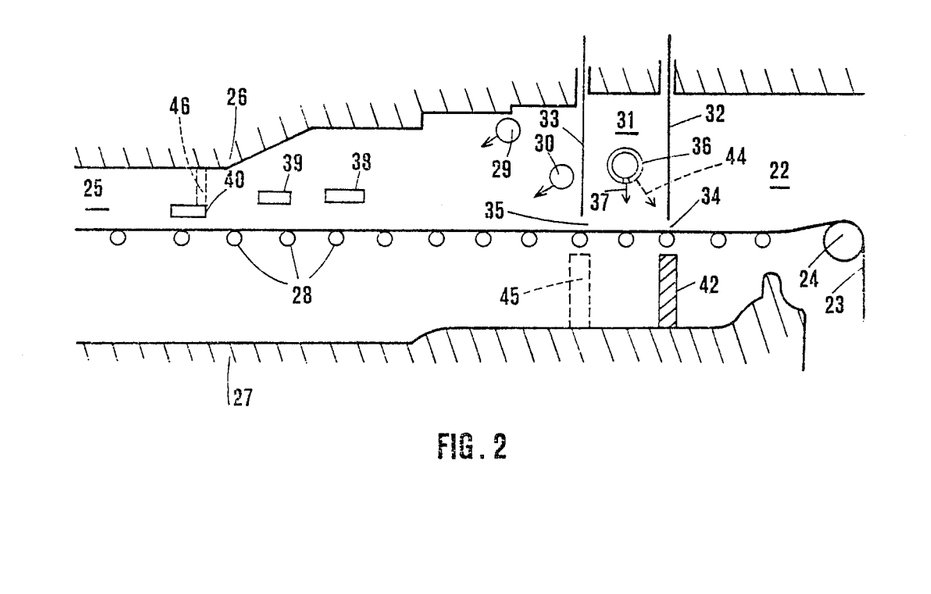

FIG. 2 of the accompanying drawings shows part of a sheet glass drawing plant of Libbey-Owens type comprising a drawing compartment 22 in which a ribbon of glass 23 is drawn upwardly from a bath (not shown) of molten glass and passes over a bending roll 24. The glass ribbon travels from this bending roll along a tunnel 25 (which is an annealing lehr) having refractory roof and sole walls 26 and 27. The ribbon is supported within the lehr by rollers 28.

Spray guns 29 and 30 are mounted in the lehr above the horizontal path of the glass ribbon and are connected to mechanisms (not shown) for displacing them to and fro along horizontal paths normal to the direction of travel of the glass ribbon. The spray guns are used for spraying material towards the ribbon to form superimposed metal oxide coatings on the glass.

Upstream from the coating zone, i.e. between the coating zone and the entrance to the lehr, there is a temperature control compartment 31 formed by providing refractory screens 32 and 33 (e.g. asbestos screens) which extend transversely across the lehr, above the path of the glass ribbon. The lower edges of these screens are spaced from the ribbon so that between such screens and the ribbon there are slots 34 and 35 via which gas can flow from the temperature control compartment in the upstream and the downstream directions. Within the temperature control compartment there is a row of axially aligned delivery ducts 36, which extends transversely across the lehr. The individual ducts are connected to an air pump (not shown) located externally of the lehr. The air delivered to the ducts 36 is preheated by heat exchangers (not shown). The temperatures of the heat exchangers are independently regulatable for controlling the temperature of the air supplied to the individual ducts. Each of the ducts 36 has a series of downwardly facing discharge orifices so that hot air pumped into the duct discharges downwardly as indicated by the arrow 37. The hot air heats the glass ribbon selectively or differentially across its width in order to promote formation of a coating of uniform or more uniform thickness. The feed rate and/or the temperature of the gas supplied to the ducts 36 can be varied at any time should this be required, e.g.

for the purpose of varying the coating thickness or adjusting the coating to suit a different drawing speed in the drawing compartment 22.

The flow rate and/or the temperature of the gas supplied to the plurality of ducts 36 as the case may be, can be controlled automatically in dependence on signals emitted by a coating thickness detector as described in connection with the apparatus shown in FIG. 1.

Preferably the hot air is fed into the compartment 31 at a volume rate sufficient to maintain escape flows of this air through slots 34 and 35 and prevent the sprays from the spray guns 29 and 30 from being adversely affected by downstream draught currents of gas through the coating zone from the drawing compartment 22.

Downstream from the coating zone there are exhaust ducts 38, 39 and 40 extending transversely across the lehr above the ribbon path. These ducts form part of an exhaust system in which suction forces are maintained for the purpose of drawing off gases in a downstream direction away from the coating zone. Such aspiration of environmental gases from the coating zone is helpful in preventing reaction products which may be formed in the environment of the coating zone from precipitating onto the glass.

Beneath the ribbon path through the lehr there is a refractory screen 42 located near the entry end of the lehr. This bottom screen serves to restrict the flow of relatively cool return gas currents beneath the ribbon path and into the drawing compartment. This has the advantage of reducing liability for entrained dust to become deposited on the glass ribbon.

In a modification of the plant shown in FIG. 2 the feed of pre-heated air into the temperature control compartment 31 takes place via discharge orifices located so that the pre-heated air discharging from the ducts 36 is directed at a downward inclination towards the upstream escape slot 34 as suggested by arrow 44.

As hereinbefore described the direction of the heating gas in that way enables draught currents from the drawing compartment to be countered more easily, provided that the screen 32 is not too high. The apparatus can also be modified by providing a second refractory screen 45, as shown in broken line, adjacent screen 42. Screen 45 supplements the action of screen 42 in restricting the return flow of gas into the drawing compartment from beneath the ribbon path and can therefore further reduce dust deposition on the glass.

Yet a further possible modification of the plant shown in FIG. 2 is the provision of a partition wall 46 shown in broken line, in association with the exhaust duct 40. This wall extends transversely across the lehr, between the duct 40 and the roof wall 26 of the lehr, and serves to prevent gas currents flowing beneath that exhaust duct from being drawn back over that duct towards the coating zone.

The invention can also be carried out by supplying coating material to the hot glass ribbon in the vapour phase. For example such a process can be performed in apparatus as shown in FIG. 1 with the modification that the spraying device is replaced by a conduit through which vaporised coating precursor compound in a carrier gas stream can be supplied to the coating station and there discharged into the entry end of a shallow flow passage defined by the glass ribbon and a hood which bridges the path of the glass ribbon. Residual vapour leaving the downstream end of the flow passage can be drawn off via a chimney or other exhaust system.

The arrangement of the vapour feed conduit and flow passage at the coating station can e.g. be as described and illustrated in United Kingdom patent No. 1 524 326. When forming a coating from the vapour phase the supply of heat at the heating station serves the same function of reducing or avoiding temperature gradients across the ribbon in order to assist the formation of a coating having required specifications.

The following are examples of processes according to the invention:

EXAMPLE 1

A ribbon of float glass having a width of about 2.5 meters and travelling from the float tank at a speed of 4.5 meters per minute, was coated by means of a coating apparatus as represented in FIG. 1.

The temperature of the glass as it approached the heating compartment 11 was 580° C. at the central region of the ribbon and 560° adjacent the edges of the ribbon.

Gas-fired radiant heaters 14 and 15 located above each marginal region of the ribbon were energised so as to heat the said marginal regions of the ribbon and thereby flatten the temperature gradient across the ribbon. The said marginal regions of the ribbon were in fact heated to a temperature very close to 580° C.

The spray gun 7 was of conventional type. The gun was mounted 25 cm above the glass ribbon and was pointed at an inclination of 30° to the ribbon plane. The gun was reciprocated at 10 cycles per minute along a path which extended slightly beyond the edges of the ribbon so that the speed of the spray gun was substantially constant over substantially the full width of the ribbon. The gun was fed under a pressure of about 3 kg/cm$^2$ with about 50 liters per hour of a solution obtained by dissolving in dimethylformamide, per liter, 140 g of cobalt acetylacetonate $Co(C_5H_7O_2)$ $2H_2O$.

Suction forces were maintained in the exhaust ducts 19 to cause gases to be aspirated downstream from the coating station but without affecting the trajectories of the droplets from the spray gun.

The rate of discharge of the coating solution was adjusted so that a coating of cobalt oxide ($Co_3O_4$) having a thickness of about 920 Å formed on the glass.

The coating, which had a brown tint viewed by transmitted light, was found to be of good optical quality and of substantially uniform thickness across the full width of the ribbon.

In a modification of the foregoing process, a cobalt oxide coating was formed on the float glass under the same conditions as before except that pre-heated gas was continuously discharged through ducting 17 as represented in broken line in FIG. 1. This had the effect of modifying the temperature conditions of the atmosphere through which the droplets travelled towards the glass ribbon with the result that the thickness of the coating was of an even higher standard of uniformity over the width of the ribbon. The temperature of the air discharged through ducting 17 can be controlled so as to compensate for the effects of any decelerations of the spray gun near the ends of its path of reciprocation.

EXAMPLE 2

A ribbon of float glass having a width of about 2.5 meters and travelling from the float tank at a speed of 4.5 meters per minute, was coated by means of a coating apparatus as represented in FIG. 1, without ducting 17.

The temperature of the glass as it approached the heating compartment 11 was 580° C. at the central region of the ribbon and 560° adjacent the edges of the ribbon.

All of the gas-fired radiant heaters 14 and 15 were operated so as to heat the ribbon over its full width during its passage beneath the heating compartment 11. The black body temperature of the radiators over the central part of the ribbon width was 1200° C. and the radiators over the marginal portions of the ribbon were operated at a somewhat higher temperature, so as to raise the temperature of the glass to about 630° C. over the full width of the ribbon.

The spray gun 7 which was of a conventional type was reciprocated across the full width of the ribbon path at a height of 25 cm above the ribbon and was inclined at 30° to the ribbon plane. The gun was fed with air as carrier gas, together with an aqueous solution formed by dissolving hydrated tin chloride ($SnCl_2.2H_2O$) in water and adding a small amount of $NH_4HF_2$. The rate of supply of the coating solution to the spray gun and its rate of reciprocation were adjusted so that a coating of $SnO_2$ having a thickness of about 7500 Å was formed, such coating having good infrared reflectivity in the wavelength range 2.6 to 40 microns. Examination of the coating showed that it was of good optical quality and of substantially uniform thickness over the full width of the ribbon.

In a comparative process the heating of the glass ribbon over its full width preparatory to entering the coating station was effected by using electrical resistance heating radiators instead of the gas-fired heaters and without using the screens 12,13. It was found that a coating of a high standard of thickness uniformity could still be achieved but the heat output from the radiators had to be higher because of the absence of the screens. Moreover there was a tendency for the steadiness of the droplet stream from the spray gun to be disturbed by convection currents along the lehr. However it was found that this can be obviated by using the heating radiators in conjunction with a single screen, which may be either screen 12 or screen 13, but s preferably screen 13.

EXAMPLE 3

A ribbon of float glass about 2.5 meters in width and travelling from the float tank at 15 meters per minute was coated by a process according to the invention using a vapour phase coating procedure. The ribbon was heated by radiant heaters located above the path of the ribbon to increase the temperature of the glass to a substantially uniform temperature of 600° C. In the absence of such heating the temperature of the glass on entering the coating station would have been approximately 575° C. at the centre of the ribbon and cooler adjacent its edges. On entering the coating station the heated ribbon was contacted with a vapour mixture containing $SnCl_4$ and $SbCl_5$ (doping agent) in a volume ratio of 100:1, entrained in a stream of nitrogen. The stream of vapour was caused to flow along the top face of the glass ribbon, in the direction of its travel, by continuously supplying the vapour into a shallow passage defined in part by the glass ribbon and in part by a shroud extending over the ribbon path, and withdrawing residual vapours into exhaust ducting at the downstream end of such passage. The said passage was 50 cm in length and its height decreased from 25 mm at its upstream (entrance) end to 10 mm at its downstream (exit) end. The passage extended over the width of the ribbon except for opposed narrow marginal zones each having a width of 10 cm. A suitable arrangement of such a shroud and exhaust ducting and means for feeding vapours along the glass ribbon, beneath the shroud, is illustrated in United Kingdom patent specification No. 1 524 326. The rate of delivery of the vapour mixture into the said passage and the draught forces through the exhaust ducting were regulated so as to maintain along the passage a substantially turbulence-free flow of vapour mixed with air which was induced to flow into and along the passage by the delivery of the vapour mixture into the passage as above referred to, and so that a coating of $SnO_2$ incorporating a small quantity of $Sb_2O_5$ and having a thickness of 2500 Å was formed on the glass ribbon. The coating had a green tint viewed by reflected light and the coated glass had the property of reflecting an appreciable proportion of incident radiation in the far infrared spectral region. The coating was found to be of uniform thickness and to have uniform optical properties over its full transverse extent across the ribbon.

EXAMPLE 4

A ribbon of glass 3 meters in width was drawn in a Libbey-Owens type drawing machine at a speed of the order of 1 meter per minute and was coated in plant as shown in FIG. 2, with the bottom screen 45, but without the barrier wall 46 above the exhaust duct 40. The temperature of the glass measured between the drawing chamber and the heating compartment 31 was 610° C. at the central region of the ribbon and decreased towards its edges.

The screens 32 and 33 forming the upstream and downstream boundary walls of the heating compartment 31 were installed as shown in the figure, corresponding with an inter-screen spacing of approximately 80 cm. The screens were set so that their lower edges were 12 mm above the glass ribbon.

Pre-heated air was discharged, at a volume rate of 900 $Nm^3$/hr, at a downward and rearward inclination into the compartment 31 (as indicated by the arrow 44) from a series of ducts 36 extending transversely across the ribbon path, the temperature of the air being higher over the marginal zones of the ribbon path than at its central region. The volume rate of the air supply to such ducts was sufficient to maintain a continuous flow of air out of compartment 31 through each of the slots 34 and 35 and the said supply rate and the pre-heat temperature of the air was such as to increase the temperature of the said marginal zones of the ribbon so that the glass ribbon had a temperature of approximately 610° C. over its full width on entering the coating station.

The exhaust system was operated to extract 6000 $Nm^3$/hr via the exhaust ducts 38,39 and 40.

The spray guns 29 and 30 were of a conventional type and were operated at a pressure of the order of 4 $kg/cm^2$. The said spray guns were located at a height of 30 cm and 20 cm respectively above the glass ribbon. Gun 29 was set at an angle of 30° and gun 30 was set at an angle of 45° to the ribbon plane.

Spray gun 30 was fed with a 5% by volume concentrated solution of tin dibutyldiacetate in dimethylformamide and was reciprocated across the full width of the ribbon path. The rate of supply of the coating solution of the gun and the speed of its reciprocation were such that an undercoating of tin oxide having a uniform thickness of 60 Å was formed on the glass ribbon.

Spray gun 29 was fed with an aqueous solution formed by dissolving hydrated tin chloride ($SnCl_2.2H_2O$) in water in an amount of 375 g per liter and adding per liter 55 g of ammonium bifluoride ($NH_4HF_2$) and the rate of supply of this solution and the speed of reciprocation of the gun were such as to form on top of the tin oxide undercoating a coating of tin oxide having a thickness of 7500 A. Examination of the coated glass showed that the coatings were of uniformly good quality over their full transverse extent across the ribbon. The coating quality was higher, notably by reason of a greater uniformity, than that obtainable in the absence of the screens 32 and 33 and the pre-heated air supply but under otherwise the same conditions. In the absence of the heating of marginal portions of the glass ribbon the thickness of the coating on those portions would have been less.

In a comparative test the pre-heated air was discharged vertically downwardly from the ducts 36, all other conditions remaining as just previously described. It was found that the volume rate of discharge of the pre-heated air into the compartment had to be increased to 1200 $Nm^3$/hr in order to obtain the same coating quality.

In a further comparative test coating was preformed as in the above Example 4 and after a certain time screen 33 was progressively raised from its initial position 12 mm above the glass ribbon. It was found that the screen could be raised to a height of up to 30 mm above the ribbon before pre-heated air ceased to flow upstream from the heating compartment via slot 34.

EXAMPLE 5

A ribbon of drawn glass was coated by the process of Example 4 but with the modification that the second bottom screen 45 was omitted and the pre-heated air was discharged vertically downwardly from the ducts 36 (as indicated by the arrow 37) and the screen 32 was set at a height of 30 mm above the glass ribbon. Under these conditions a coating quality as good as that obtained in Example 4 was obtainable provided the volume rate of supply of pre-heated air to the ducts 36 was sufficiently increased. A suitable volume rate was found to be 1800 $Nm^3$/hr.

EXAMPLE 6

A process was performed corresponding with Example 5 but with the modification that the apparatus included a barrier wall 46 above the exhaust duct 40 and a second bottom screen 45 below the ribbon path, and both of the screens 32 and 33 were set at a height of 18 mm above the ribbon. The volume rate of pre-heated air to the ducts 36 over the marginal portions of the glass ribbon was 1200 $Nm^3$/hr. Under these conditions coatings of a quality matching those obtained in Example 4 were formed.

We claim:

1. A process for forming a metal or metal compound coating on a face of a freshly formed ribbon of hot glass during its travel from a flat glass forming installation, by contacting such face at a coating station with a fluid medium or fluid media comprising a substance or substances from which said coating metal or metal compound is formed on said face, characterised in that preparatory to being coated, the glass (4, 23) is thermally conditioned at a thermal conditioning station between the flat glass forming installation and the coating station, so as to eliminate or reduce temperature gradients across the ribbon width to be coated.

2. A process according to claim 1, characterised in that said thermal conditioning station is constituted as a heating station which is controlled so that one or more portions of the ribbon width is or are selectively or differentially heated.

3. A process according to claim 2, characterised in that heat is supplied at said heating station so as only to heat marginal portions of the ribbon width to be coated.

4. A process according to claim 2, characterised in that heat is supplied at the heating station so that the whole of the ribbon width to be coated is heated but to an extent which varies transversely of the ribbon.

5. A process according to claim 2, 3 or 4, characterised in that heat is supplied at the heating station from one or more radiant heaters (14, 15).

6. A process according to claim 2, characterised in that heat is supplied at said heating station wholly or mainly by introducing pre-heated gas (37, 44) from an extraneous source into the environment above the glass ribbon.

7. A process according to claim 1, characterised in that a transverse screening wall (13, 33) is provided above the ribbon path, between the coating and thermal conditioning stations.

8. A process according to claim 1, characterised in that the glass ribbon (4, 23) is heated at the thermal conditioning station by heat supplied from within a temperature control compartment which is located above the ribbon and the interior of which is exposed to the ribbon, such compartment having upstream (12, 32) and downstream (13, 33) boundary walls whose lower edges are spaced from the ribbon.

9. A process according to claim 8, characterised in that one or more partition walls is (are) present in said temperature control compartment (11, 31) whereby it is divided into side by side sections thereby to promote the selective or differential thermal conditioning of portions of the ribbon width.

10. A process according to claim 8 or 9, characterised in that the thermal conditioning of the glass ribbon (4, 23) at the thermal conditioning station is achieved wholly or mainly by feeding pre-heated gas from an extraneous source into said temperature control compartment (31), and the rate of feed of the hot gas into such compartment (31) is sufficient to maintain a continuous upstream and downstream flow of gas from said compartment via the slots (34, 35) between the glass ribbon (23) and the upstream (32) and downstream (33) boundary walls of the compartment.

11. A process according to claim 10, characterised in that the hot gas is fed into said compartment (31) in a direction (44) which is inclined downwardly towards the upstream slot.

12. A process according to claim 1, characterised in that the conditioning of the glass ribbon (4, 23) at the thermal conditioning station is automatically controlled in dependence on signals emitted by a device which detects thickness values of the coating on the glass ribbon (4, 23) at a detecting station located downstream from the coating station.

13. A process according to claim 1, characterised in that the coating is formed from a coating precursor compound which is sprayed in solution onto the glass ribbon (4), the spray droplets forming at least one stream which is inclined downwardly towards the ribbon (4) in the direction of its movement (5) or in the opposite direction, and in that at least one current of pre-heated gas is discharged in the same direction above the glass ribbon and said gas current influences the temperature of the spray droplets on their way to the glass ribbon (4).

14. Apparatus suitable for use in coating a freshly formed ribbon of hot glass during its travel from a flat glass forming installation, said apparatus comprising means (7–10, 29, 30) for delivering (a) fluid coating medium or media into contact with the glass (4, 23) at a coating station, characterised in that there is means (14–16, 36) whereby the temperature of one or more portions of the ribbon width can be conditioned selectively or differentially at a thermal conditioning station constituted as a heating station incorporating heating means and located between the flat glass forming installation and said coating station, so as to eliminate or reduce temperature gradients across the ribbon width to be coated, and regulating means for varying the selective or differential heat supply distribution at said heating station.

15. Apparatus according to claim 14, characterised in that the heating means (14,15, 36) is arranged for heating only opposed marginal portions of the ribbon width to be coated.

16. Apparatus according to claim 14, characterised in that the heating means (14–15, 36) is arranged for heating the whole of the ribbon width to be coated but to an extent which varies transversely of the ribbon.

17. Apparatus according to claim 14, characterised in that said heating means comprises radiant heaters (14, 15).

18. Apparatus according to claim 14, characterised in that there is a transverse screening wall (13, 33) above the glass ribbon path, between the thermal conditioning and coating stations.

19. Apparatus according to claim 14, characterised in that said heating station comprises a temperature control compartment which is located above the glass ribbon path and the interior of which is exposed to such path, said compartment having upstream (12, 32) and downstream (13, 33) boundary walls whose lower edges are spaced from the ribbon path, and said heating means is disposed within said compartment to supply heat to the glass ribbon.

20. Apparatus suitable for use in coating a freshly formed ribbon of hot glass during its travel from a flat glass forming installation, said apparatus comprising means (7–10, 29, 30) for delivering (a) fluid coating medium or media into contact with the glass (4, 23) at a coating station, characterised in that there is means (14–16, 36) whereby the temperature of one or more portions of the ribbon width can be conditioned selectively or differentially at a thermal conditioning station constituted as a heating station incorporating heating means (14–15, 36) and located between the flat glass forming installation and said coating station, so as to eliminate or reduce temperature gradients across the ribbon width to be coated, and in that said heating station comprises a temperature control compartment which is located above the glass ribbon path and the interior of which is exposed to such path, said compartment having upstream (12, 32) and downstream (13, 33) boundary walls whose lower edges are spaced from the ribbon path, and said heating means is disposed within said compartment to supply heat to the glass ribbon, and in that there is or are one or more partition walls within said temperature control compartment (11, 31) whereby the compartment is divided into side by side sections, such partition wall(s) serving to concentrate the action of the heating means on particular portions of the ribbon width to be coated.

21. Apparatus according to claim 19 or 20, characterised in that the heating means comprises gas discharge ducting (36) arranged for discharging pre-heated gas into said temperature control compartment from an extraneous source.

22. Apparatus according to claim 21, characterised in that said gas discharge ducting (36) is arranged for discharging pre-heated gas into said temperature control compartment in a direction (44) which is inclined downwardly towards the slot between the upstream boundary wall (32) of such compartment (31) and the path of the glass ribbon.

23. Apparatus suitable for use in coating a freshly formed ribbon of hot glass during its travel from a flat glass forming installation, said apparatus comprising means (7–10, 29, 30) for delivering (a) fluid coating medium or media into contact with the glass (4, 23) at a coating station, characterised in that there is means (14–16, 36) whereby the temperature of one or more portions of the ribbon width can be conditioned selectively or differentially at a thermal conditioning station constituted as a heating station incorporating heating means (14–15, 36) and located between the flat glass forming installation and said coating station, so as to eliminate or reduce temperature gradients across the ribbon width to be coated, and the heating means (36) is arranged for heating the glass wholly or mainly by introducing preheated gas (37, 44) from an extraneous source into the environment above the glass ribbon (23) at the heating station, in that said heating means comprises ducting (36) having gas discharge orifices located over at least certain portions of the ribbon path through the heating station and in that said heating means is arranged so that streams of gas at different temperatures can be supplied to different discharge orifices.

24. Apparatus suitable for use in coating a freshly formed ribbon of hot glass during its travel from a flat glass forming installation, said apparatus comprising means (7–10, 29, 30) for delivering (a) fluid coating medium or media into contact with the glass (4, 23) at a coating station, characterised in that there is means (14–16, 36) whereby the temperature of one or more portions of the ribbon width can be conditioned selectively or differentially at a thermal conditioning station constituted as a heating station incorporating heating means (14–15, 36) and located between the flat glass forming installation and said coating station, so as to eliminate or reduce temperature gradients across the ribbon width to be coated, and said apparatus further comprises means for determining the thickness of the coating on the moving glass ribbon (4, 23) and for emitting signals which automatically control the supply of heat to the glass at the heating station.

* * * * *